UNITED STATES PATENT OFFICE.

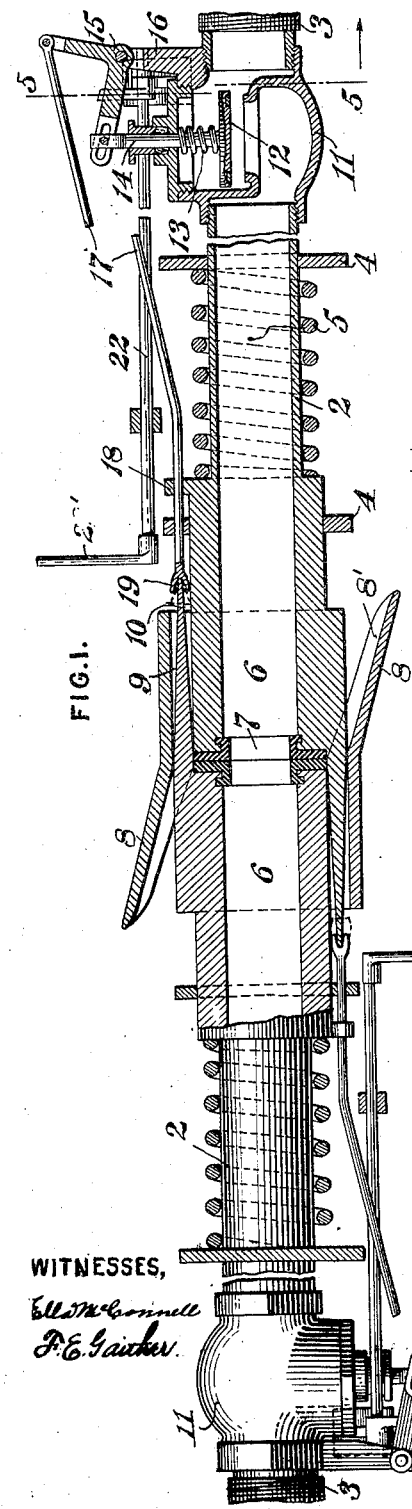
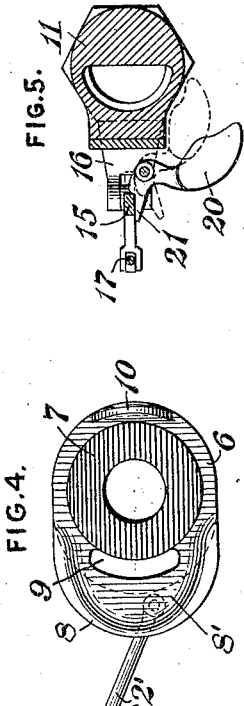
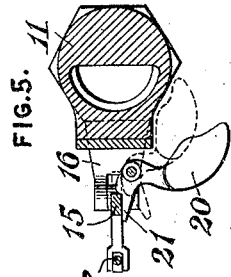
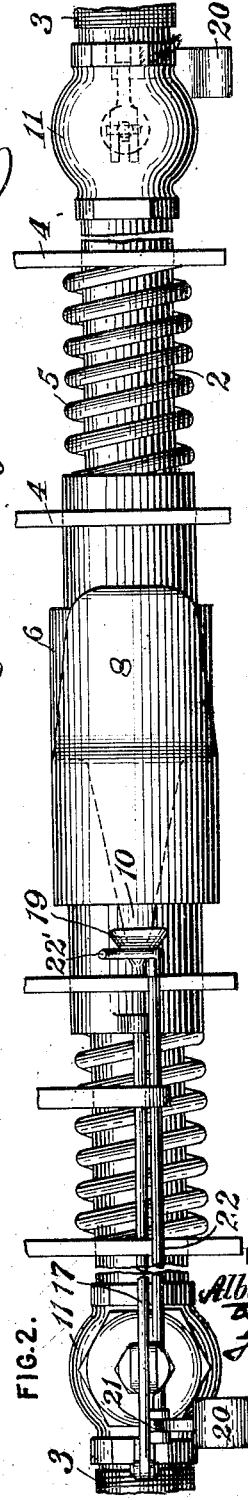
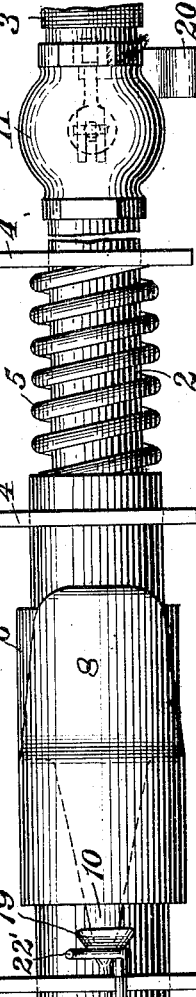

ALBERT L. LINDH, OF IRWIN, PENNSYLVANIA, ASSIGNOR OF ONE-THIRD TO HARRY WHITE, OF IRWIN, PENNSYLVANIA.

TRAIN-PIPE COUPLING.

963,599.

Specification of Letters Patent.

Patented July 5, 1910.

Application filed February 25, 1910. Serial No. 545,980.

*To all whom it may concern:*

Be it known that I, ALBERT L. LINDH, a resident of Irwin, in the county of Westmoreland and State of Pennsylvania, have invented certain new and useful Improvements in Train-Pipe Couplings, of which the following is a specification.

One object of this invention is to provide the brake and other train pipes with coupling heads of improved construction which effect a positive and sure connection automatically when brought together upon the coupling of two cars, the pipes being brought into accurate register and providing a seal at the joint.

For air-brake equipment each train pipe is provided adjacent its end with a valve which is normally open so that the brakes may set when the cars separate, or in the event of the train pipe being broken at the coupling or other point. It is frequently desired to close these valves, for instance when shifting the cars, so that the airbrake will not be operative at such time.

It is therefore a further object of this invention to provide valve mechanism of improved construction; also to so construct a coupling that it will automatically open the valves when the coupling is made after the valves are closed, and by this means making the air-brake equipment effective as soon as the cars are coupled. If the valves are open before the cars are brought together, the valve operating means is simply inactive during the coupling operation.

Still a further object is to provide improved means for locking the valves in open position.

In the accompanying drawings, Figure 1 is a sectional plan of the improvements, showing two train pipes equipped with and coupled by the coupling heads of novel design, at the right hand of the figure the valve mechanism being shown in section, and at the left hand in top plan. Fig. 2 is a side elevation of the structures shown in Fig. 1. Fig. 3 is a side elevation of one of the coupling heads, and Fig. 4 an end elevation. Fig. 5 is a cross-section on line 5—5 of Fig. 1, illustrating the locking mechanism.

Referring to the drawings, 2 are the outer portions of the train pipes, having flexible or hose connections 3 with the main train pipes, not shown. Each of pipes 2 is movable longitudinally in supports 4 secured in any suitable manner to the car, with springs 5 holding the pipes normally extended and permitting them to move backwardly when the coupling is made.

At the outer end of each pipe 2 is a head 6, the bore of which forms a continuation of the pipe, and at the extremity of the bore is a rubber face or gasket 7 which seals the joint when the two heads are brought together, as in Fig. 1. Projecting forwardly from one side of each head is the guiding arm 8, which preferably extends at an angle to the axis of pipe 2, with its oblique inner face 8' engaging the other head as the two heads come together, placing the same into exact register. With a guiding arm on each of the heads and at opposite sides of the coupling, and each arm in position to direct or guide the other head, an accurate coupling is always assured. And with said arms 8 deflected outwardly or laterally considerable range is afforded for lining up the coupling heads even if they are materially out of line before coming together. At the base of each arm 8 the head is formed with longitudinal backwardly extending passage 9, and at the side of each head opposite arm 8 is the forwardly extending prong 10 which is brought into register with passage 9 of the other head by engaging face 8' of arm 8, and passes through said passage as the coupling is effected, and operates the valve opening means, as will presently be described.

When the improved coupling is applied to air-brake equipment, it is desirable to provide each train pipe with a valve which may be closed so as to render the brake apparatus inoperative during the switching of cars, etc., which valves are normally open, or at least open when the cars are coupled. And it is further desirable that these valves be opened whenever the pipes are coupled, and a characteristic of the present invention is that if they are closed prior to the cars being coupled they are opened automatically by the coupling operation.

The valve structure for each pipe consists of the valve body or shell 11, and 12 is the check-valve proper which when free to move is seated by spring 13, closing the train pipe. In the present embodiment, valve stem 14 is connected to one arm of bell-crank 15 fulcrumed to support 16 rigid with the valve body, and with the other arm of the bell-crank connected to the forwardly extending rod 17, which may move in guide 18 secured to pipe 2 rearwardly from head 6 and in line with head-passage 9. The forward extremity of the rod may be provided with the cup-like enlargement 19 to receive the extremity of prong 10, being moved backwardly thereby and operating to open the valve when the coupling is made. Of course if the valve is open at such time, rod 17 is in backward or inward position and is not reached by prong 10 until the coupling is fully made. For holding the valve open, the weighted latch 20 is pivoted to support 16, with upper extremity 21 of the latch moved by the weight into the path of the bell-crank whenever the latter is in outward position with the valve open, as in Fig. 1. The valve is thus locked in open position and can be closed only by lifting the weighted latch 20, and thereby depressing its upper extremity 21. The latch may be thus operated by various means, one of which may be a rod 22 secured to the latch coincident with its fulcrum and extending forwardly to the end of the car in convenient position to be operated by crank 22'. Obviously, various other devices may be provided for thus manipulating the latch. Normally, the latch locks the valve in open position and it so remains when the cars are uncoupled, so that the brakes are set instantly upon the uncoupling of the cars or if the train pipe or the coupling becomes broken, the brake may be made ineffective by manipulating the latch and thus permitting the valve to close, as when the uncoupled cars are to be shifted, etc.

I claim:

1. The combination of opposing tubular coupling heads having registering end openings, interlocking projections on the heads guiding and holding them in register, a rod movable longitudinally of the exterior of each head and adapted to be engaged and moved rearwardly by a projection on the other head, and a self-closing valve for the head connected to and opened by the rearward movement of the rod.

2. The combination of opposing tubular coupling heads having registering end openings, interlocking projections on the heads guiding and holding them in register, a rod movable longitudinally of each head with the forward extremity of the rod carrying a socket to receive the extremity of a projection on the other head, and a self-closing valve for the head connected to the rod and opened by the backward movement thereof.

3. The combination of opposing tubular coupling heads having registering end openings, interlocking projections on the heads guiding and holding them in register, a rod movable longitudinally of each head, said rod engaged and moved rearwardly by one of the projections of the other head, a self-closing valve for the head opened by the backward movement of the rod, means acting automatically to hold the valve open after it has been opened by said rod, and a hand operated device for releasing the valve.

4. In a train pipe coupling, the combination of two pipes to be coupled, a self-closing valve for each pipe, means actuated when the pipes are brought together for opening the valves, weighted latches automatically locking the valves in open position, and means for moving the latches out of locking position.

In testimony whereof I affix my signature in presence of two witnesses.

ALBERT L. LINDH.

Witnesses:
AXEL OLSON,
HARRY WHITE.